US006738235B1

(12) United States Patent
Mao

(10) Patent No.: US 6,738,235 B1
(45) Date of Patent: May 18, 2004

(54) STRUCTURES AND MATERIALS TO STABILIZE ACTIVE LAYERS IN VGMR HEAD USING AFM TRANSVERSE BIAS

(75) Inventor: Sining Mao, Savage, MN (US)

(73) Assignee: Seagate Technology LLC, Scotts Valley, CA (US)

(*) Notice: Subject to any disclaimer, the term of this patent is extended or adjusted under 35 U.S.C. 154(b) by 183 days.

(21) Appl. No.: 09/813,411

(22) Filed: Mar. 21, 2001

Related U.S. Application Data

(60) Provisional application No. 60/191,827, filed on Mar. 24, 2000.

(51) Int. Cl.[7] ............................. G11B 5/127; G11B 5/39
(52) U.S. Cl. ........................................................ 360/324
(58) Field of Search ............................... 360/324, 313, 360/110, 327.3, 327.32

(56) References Cited

U.S. PATENT DOCUMENTS

| | | | | |
|---|---|---|---|---|
| 5,739,987 A | * | 4/1998 | Yuan et al. | 360/327.32 |
| 5,742,459 A | * | 4/1998 | Shen et al. | 360/327.32 |
| 6,221,518 B1 | * | 4/2001 | Araki et al. | 428/692 |
| 6,266,218 B1 | * | 7/2001 | Carey et al. | 360/324.12 |
| 6,483,674 B1 | * | 11/2002 | Kanai et al. | 360/324.12 |
| RE37,992 E | * | 2/2003 | Saito et al. | 360/327.32 |
| 2002/0150675 A1 | * | 10/2002 | Everitt et al. | 427/128 |

OTHER PUBLICATIONS

Pohm, A. V, "Narrow End–On Giant Magnetoresistance READ–Head Sensors", May 1997, IEEE Transactions on Magnetics, v. 33, No. 3, pp. 2392–2396.*

Pohm, A. V., "Two Leg, Side by Side, 0.6 to 1.0 Micron Wide, High Output, Vertical, GMR, Head Sensors", Jul. 1998, IEEE Transactions on Magnetics, v. 34, No. 4, pp. 1486–1488.*

* cited by examiner

Primary Examiner—Julie Anne Watko

(57) ABSTRACT

A stabilized vertical GMR head is provided and includes a GMR stack having a pair of free magnetic layers having a first edge and a second edge. A pair of soft magnetic layers is also included and positioned so that one of the soft magnetic layers is adjacent to the first edge and another of the soft magnetic layers is adjacent to the second edge. A pair of AFM layers is included and positioned so that one of the AFM layers is adjacent to one of said soft magnetic layers and another of said AFM layers being adjacent to other of said soft magnetic layers.

9 Claims, 4 Drawing Sheets

STRUCTURES AND MATERIALS TO STABILIZE ACTIVE LAYERS IN VGMR HEAD USING AFM TRANSVERSE BIAS

CROSS-REFERENCE TO RELATED APPLICATION

This application claims the benefit of the filing date of U.S. provisional application serial No. 60/191,827 entitled "Structures and Materials To Stabilize Active Layers in VGMR Head Using AFM Transverse Bias," which was filed on Mar. 24, 2000.

BACKGROUND

The following invention relates to increasing the stability of vertical GMR (VGMR) heads and, in particular, to a method for stabilizing the free layers in VGMR heads using antiferromagnetic materials.

Referring to FIG. 1, there is shown a prior art giant magneto-resistive (GMR) sensor 2, also called a spin valve (SV) sensor, used for reading magnetically encoded data from the surface of magnetic media. SV sensor 2 includes a layered stack that is sensitive to the changing magnetic fields originating from a storage medium. The layered stack includes a free magnetic layer 4, a non-magnetic Cu layer 6, a pinned magnetic layer 8 and a pinning layer 10 that fixes the magnetic orientation of pinned magnetic layer 8. In operation, the changing magnetic fields originating from the magnetic storage medium produce a change in the magnetization direction of free magnetic layer 4 with respect to pinned magnetic layer 8 and thereby changes the resistance of SV sensor 2. This change in resistance is sensed to indicate the information stored on the magnetic medium.

A known problem associated with SV sensors is that they often "fracture" into multiple magnetic domains when exposed to an external magnetic field creating what is called "Barkhausen-noise" that adversely affects the stability and sensitivity of the SV sensor. To maximize the SV sensor's performance, it is desirable to maintain the GMR stack in a single domain state using a process known as boundary control stabilization.

A number of methods exist for stabilizing a SV sensor in a single domain state. For example, in FIG. 1, SV sensor 2 is stabilized using antiferromagnetic (AFM) exchange coupling in which the wing areas of free magnetic layer 4 is pinned by AFM layers 12,12' and the center portion of free magnetic layer 4 is the "active" sensing area. Thus, AFM exchange coupling creates a single state in the GMR stack thereby eliminating the noise associated with domain activity.

Another prior art method used to stabilize SV sensors is hard biasing in which a permanent magnet is positioned adjacent to the active area of the GMR stack in order to boundary control stabilize the active area of the GMR stack.

Yet other methods exists for stabilizing SV sensors including permanent magnet (PM) ferromagnetic coupling and configuring the GMR stack according to advantageous geometries.

Referring now to FIG. 2, there is shown a VGMR head 14 capable of supporting much greater track densities than GMR heads. Unlike SV heads, VGMR heads have a GMR stack 16 in which both magnetic layers are free and respond to the external magnetic fields emanating from the magnetic media. In VGMR head designs both free layers have to be kept in a single domain configuration in order to achieve electrical stability. Due to geometric restraints, however, the prior art stabilization techniques used for SV sensors are unsuitable for VGMR sensors (see A. V. Pohm, et. Al., IEEE Tran. Magn. 33, 2392 (1997)).

A prior art method for stabilizing VGMR heads, as shown in FIG. 2, is to use hard edge stabilization (see A. V. Pohm, et. Al., IEEE Tran. Magn. 34, 1486 (1998)). In hard edge stabilization, the edges of the free magnetic layers are placed adjacent the air bearing surface (ABS) and are used to sense the changing magnetic fields of the magnetic media. Because the coercitivity of the edges of the free layers is higher than their center areas, hard edge stabilized VGMR heads demonstrate improved stability.

Using hard edge stabilization to stabilize VGMR heads, however, has several drawbacks. First, for reasons not well understood, hard edge stabilization is difficult to realize. Also, while hard edge stabilization improves the stabilization of the VGMR head, it does completely stabilize the head. Furthermore, hard edge stabilized VGMR heads are difficult to produce in volume. It has been found that, in volume production, hard edge stabilized VGMR heads have only a 50% stability yield, which is an unacceptably low rate.

Accordingly, it is desirable to provide a method for stabilizing the free magnetic layers in VGMR heads that is suitable for volume production.

SUMMARY OF THE INVENTION

The present invention is directed to overcoming the drawbacks of the prior art. Under the present invention a stabilized vertical GMR head is provided and includes a GMR stack having a pair of free magnetic layers and having a first edge and a second edge. A pair of soft magnetic layers is also included and positioned so that one of the soft magnetic layers is adjacent to the first edge of the GMR stack and another of the soft magnetic layers is adjacent to the second edge of the GMR stack. A pair of AFM layers are included and positioned so that one of the AFM layers is adjacent to one of said soft magnetic layers and another of said AFM layers is adjacent to the other of said soft magnetic layers. Thus, by positioning the AFM layers in such a manner, a vertical GMR head is provided in which the free magnetic layers are stabilized and that is suitable for volume production.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which:

FIG. 3b is a side view of a VGMR head of FIG. 3a;

DETAILED DESCRIPTION OF THE PREFERRED EMBODIMENTS

Figure 3A:
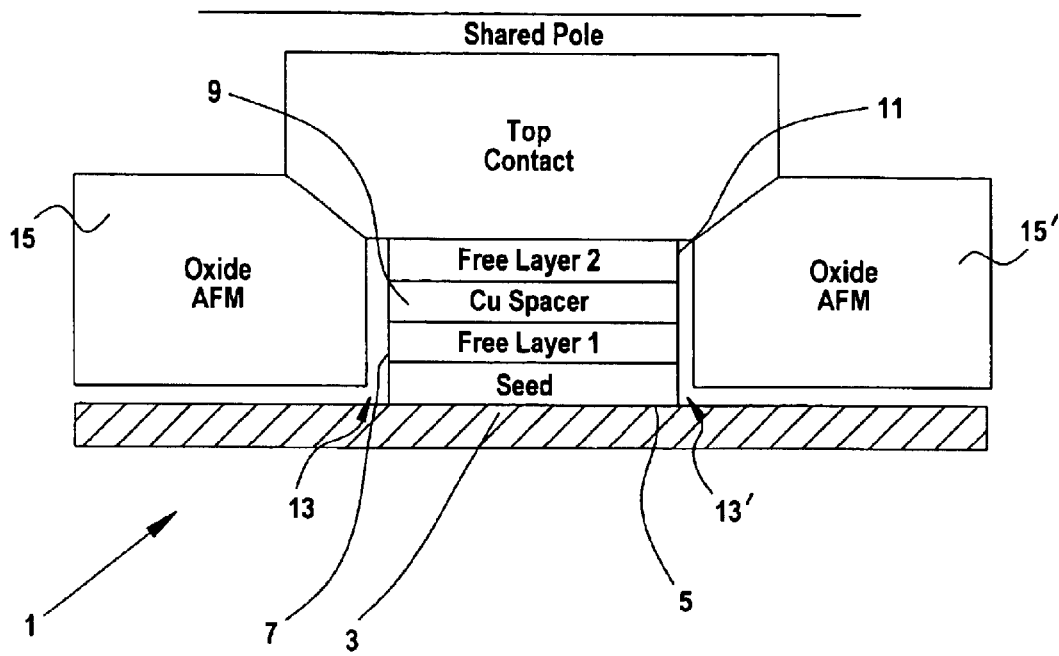
FIG. 3a is a top view of a VGMR head that is edge stabilized using AFM pinning layers in accordance with the present invention.
Figure 3B:
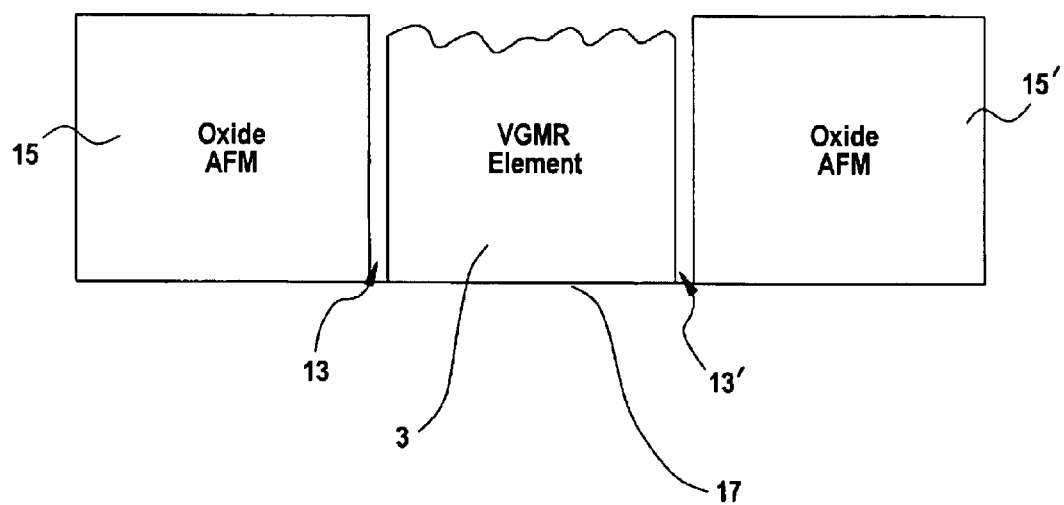

Referring now to FIGS. 3a,3b there is shown a top view and side view, respectively, of a VGMR head 1 that is edge stabilized using an AFM pinning layer in accordance with the present invention. Head 1 includes a GMR stack 3 that is constructed from a seed layer 5, a first free magnetic layer 7, a Cu spacer 9 and a second free magnetic layer 11, as is well known in the art. GMR stack 3 has a sensing area 17 used for sensing the changes of magnetic fields emanating from the magnetic disk (not shown).

Adjacent each side of GMR stack 3 and perpendicular to free magnetic layers 7,11 are thin soft magnetic layers 13, 13', respectively. Thin soft magnetic layers 13,13' are deposited adjacent GMR stack 3 using any suitable manufacturing method including, but not limited to, magnetron sputtering, ion beam deposition and S-gun sputtering. In an exemplary embodiment, soft magnetic layers 13,13' are constructed from NiFeX where X can be Ta, Cr, Rh, Re, Nb or other soft magnetic layers such as Co or Co alloys, and have a thickness in the range of 20 to 50 angstroms. By depositing soft magnetic layers 13,13' adjacent to each side of GMR stack 3 as described above, magnetic coupling and direct exchange coupling are established between soft magnetic layers 13,13' and free magnetic layers 7,11.

Adjacent each of soft magnetic layers 13,13' is one of AFM layers 15,15'. In an exemplary embodiment, AFM layers 15,15' are constructed from an insulating oxide material such as, by way of non-limiting example, NiO and $Fe_2O_3$, $Fe_3O_4$, CoO. $Fe_2O_3$ or $MnO.Fe_2O_3$. a preferred embodiment, soft magnetic layers 13,13' and AFM layers 15,15' are deposited adjacent soft magnetic layers 13,13' in a vacuum environment in-situ so that exchange coupling is established between soft magnetic layers 13,13' and AFM layers 15,15', respectively. In an exemplary embodiment, AFM layers 15,15' are 100–500 angstroms thick and are deposited using any suitable technique including, by way of non-limiting example, DC sputtering, ion beam deposition and diode deposition.

Figure 1:
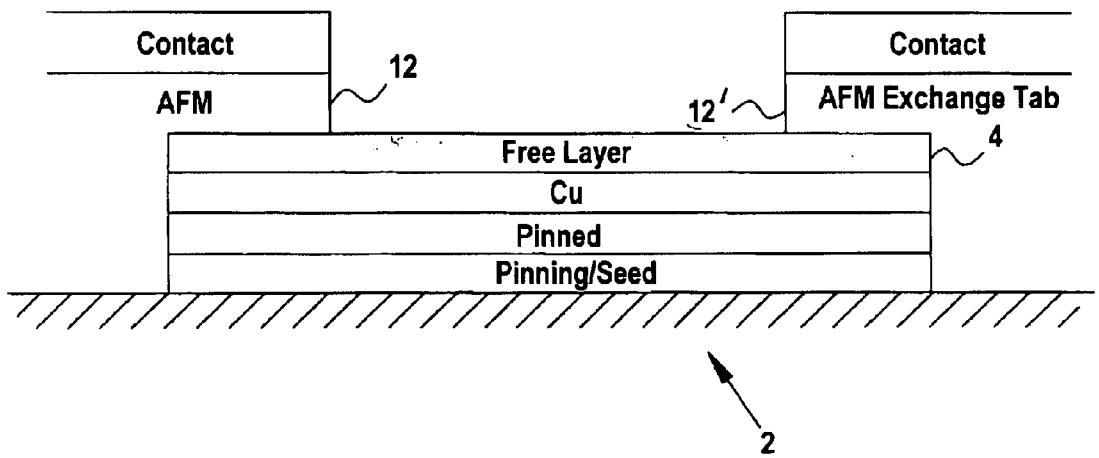
FIG. 1 shows the prior art technique of exchange stabilization used for giant magneto-resistive (GMR) sensors.
Figure 2:
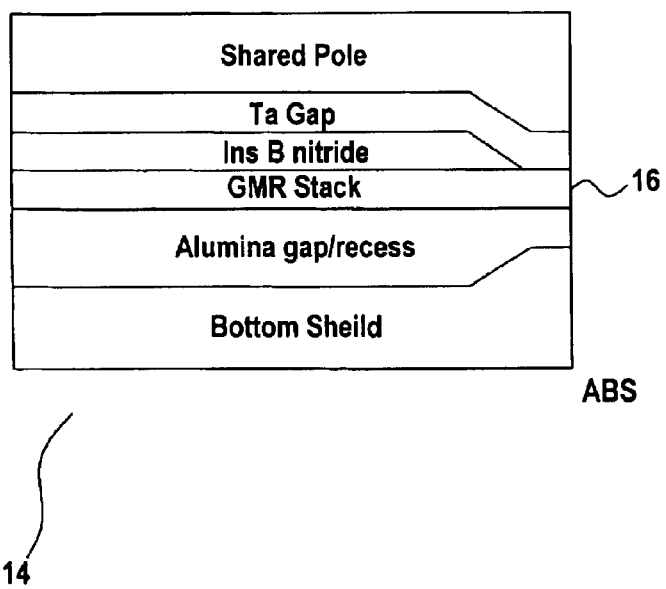
FIG. 2 shows the prior art technique of hard edge stabilization used for single leg vertical GMR (VGMR) heads.

Because AFM layers 15,15' are positioned on the side of GMR stack 3 and do not cover sensing area 17, temperature increases in AFM layers 15,15' due to current flow is limited, as compared with AFM layers 12,12' of the prior art design shown in FIG. 1. As a result of the lower temperatures in AFM layers 15,15', a wider range of materials may be used for AFM layers 15,15', such as NiO and $Fe_2O_3$. In addition, the reduced temperatures result in the optimization of the exchange coupling between soft magnetic layers 13,13' and AFM layers 15,15' as well as the edge stabilization of free magnetic layers 7,11.

In an exemplary embodiment, software magnetic layers 13,13' have a pinning field in the range of 100 Oe–500 Oe. In another exemplary embodiment, soft magnetic layers 13,13' are constructed from NiFe and AFM layers 15,15' from NiO and have exhibited a exchange coupling that resulted in a 300 Oe pinning field using a 25 angstrom layer of NiFe. Combining this pinning field with shape anisotropy of the vertical GMR sensing layer, as is well known in the art, this pinning field is well above the switching field of a real head and thus will provide stable sensing operation.

Figure 4:
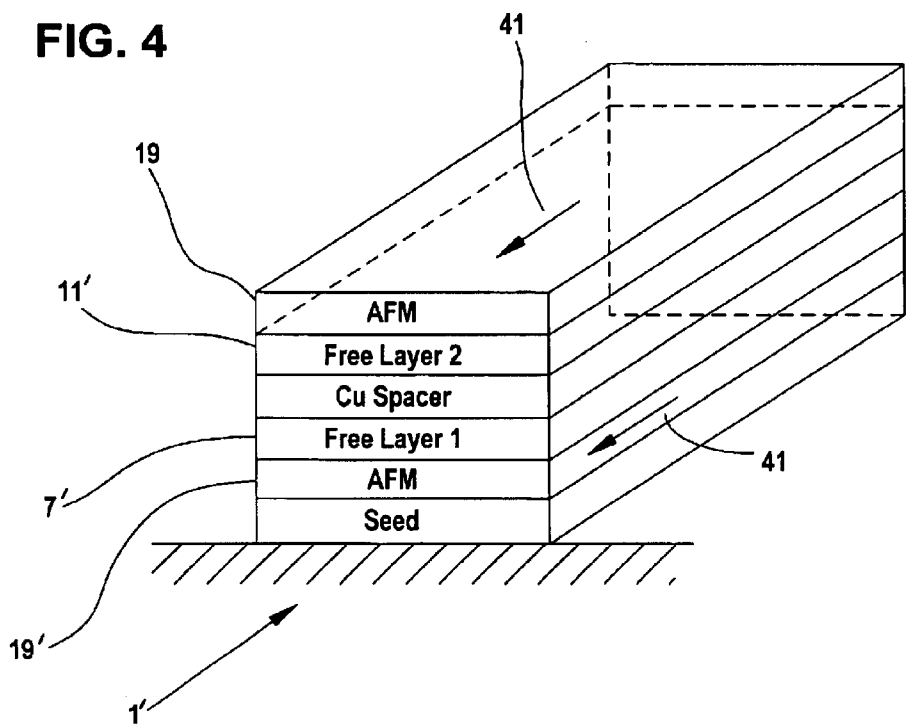
FIG. 4 is a perspective view of a VGMR that is edge stabilized using AFM pinning layers that are adjacent to the free magnetic layers head according to an alternative embodiment of the present invention.

Referring now to FIG. 4, there is shown a perspective view of a VGMR head 1' that is edge stabilized using AFM layers 19,19' that are adjacent to free magnetic layers 7',11' according to an alternative embodiment of the present invention. In this embodiment, each of AFM layers 19,19' are placed adjacent and parallel to one of free magnetic layers 7',11' without having a soft magnetic layer placed therebetween. In an exemplary embodiment, AFM layers 19,19' can be made from Mn based AFM materials such as, by way of non-limiting example, IrMnX where X is selected from the group of Ta, Cr, B, Ni, Rh, Re and W where X has an atomic concentration in the range of 0 to 10%. Alternatively, AFM layers 19,19' can be made from an oxide such as NiO and $Fe_2O_3$.

Because AFM layers 19,19' are in direct contact with free magnetic layers 7',11', respectively, a pinning field of 300 Oe or greater is easily achieved using a NiFe layer of approximately 50 A. In addition, the use of X in IrMnX for AFM layers 19,19' will increase the resistance of AFM layers 19,19' thereby reducing the shunting. Also, the selection of X can be made to adjust the exchange coupling strengths between AFM layers 19,19' and free magnetic layers 7',11' to achieve the optimum bias field for balancing the sensitivity and stability of head 1'. In an exemplary embodiment, a separation layer (not shown) made from Cu, Ag or Au can be placed between AFM layers 19,19' and free magnetic layers 7',11'to adjust the coupling strength to achieve optimal stability and sensitivity. In an exemplary embodiment, AFM layer 19 has a pinning field 41 and AFM layer 19' has a pinning field 41' and pinning field 41 is parallel to pinning field 41'.

Figure 5:
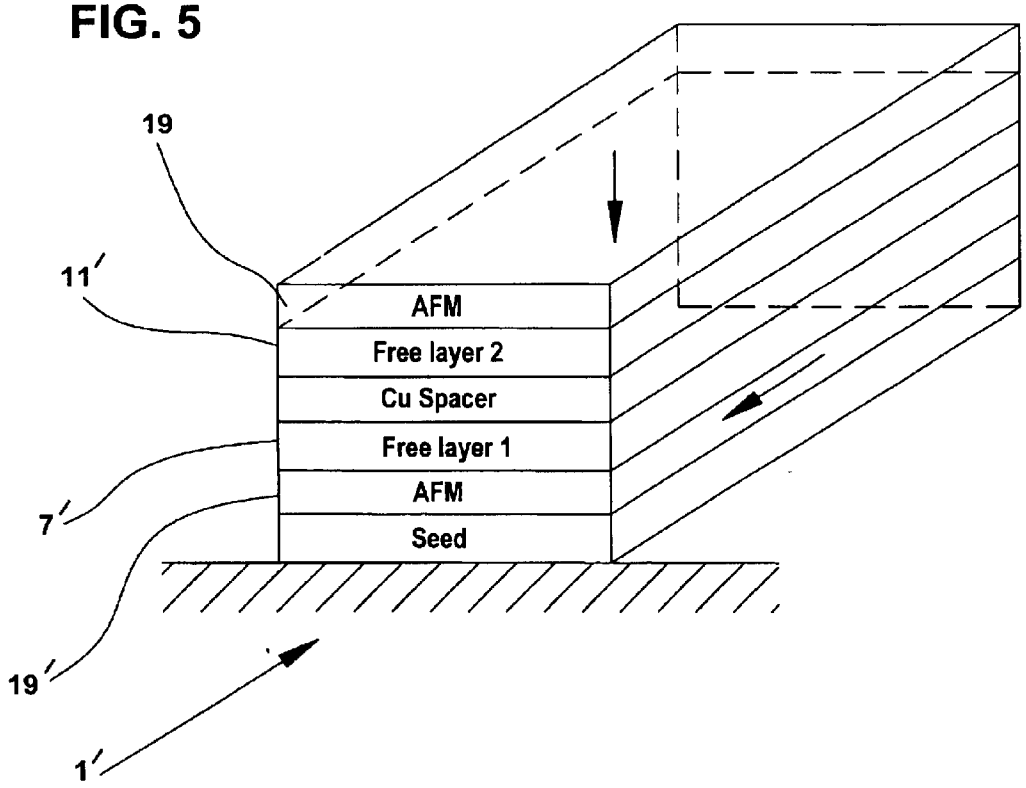
FIG. 5 is a perspective view of a VGMR that is edge stabilized using AFM pinning layers that are adjacent to the free magnetic layers head according to another alternative embodiment of the present invention.

Referring now to FIG. 5, there is shown a perspective view of a VGMR head 1" that is edge stabilized using AFM layers 19,19' that are adjacent to free magnetic layers 7',11 ' according to another alternative embodiment of the present invention. Elements that are similar to the elements of VGMR head 1' are identically labeled and a detailed description thereof is eliminated. In VGMR head 1", AFM layer 19 has a pinning field 43 and AFM layer 19' has a pinning field of 43' and pinning field 43 and pinning field 43' are not parallel but are at an angle with respect to each other. In an exemplary embodiment, pinning field 43 and pinning field 43' are perpendicular to each other.

Figure 6:
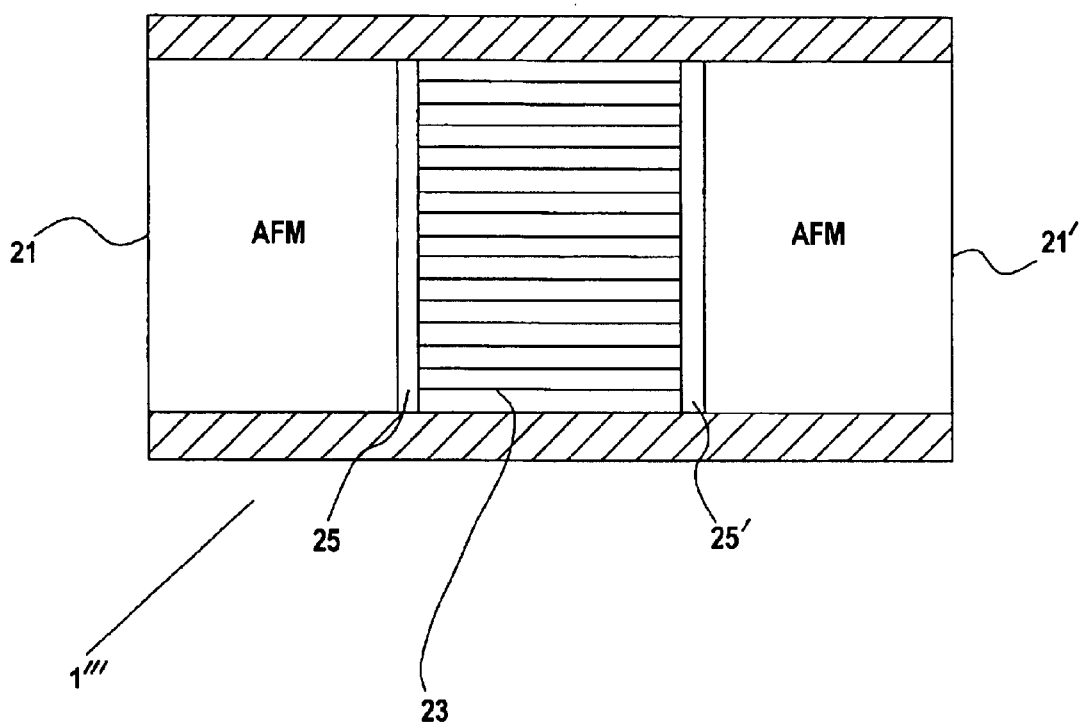
FIG. 6 is a top view of a CPP-GMR head that is edge stabilized using AFM pinning layers in accordance with another embodiment of the present invention.

Referring now to FIG. 6, there is shown a top view of a current-perpendicular-to-plane (CPP) GMR head 1''' that is edge stabilized using AFM pinning layers 21,21' in accordance with another embodiment of the present invention. CPP-GMR head 1" includes a GMR stack 23 for sensing changes in magnetic fields emanating from magnetic disk (not shown). As in the embodiment of FIG. 3a, adjacent each side of GMR stack 23 is a thin soft magnetic layer 25, 25' and adjacent each of soft magnetic layers 25,25' is one of AFM layer 21,21'. As in the previous embodiments, the pinning field provided by AFM layers 21,21' results in CPP-GMR head 1" having a stable sensing operation.

Accordingly, by using AFM pinning layers in accordance with the present invention, a head design suitable for VGMR and CPP-GMR heads is provided that is easily manufactured and that provides stable sensing operations.

A number of embodiments of the present invention have been described. Nevertheless, it will be understood that various modifications may be made without departing from the spirit and scope of the invention. Accordingly, other embodiments are within the scope of the following claims. Because certain changes may be made in the construction set forth above without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A magnetic head, comprising:
    a GMR stack having a ton surface, a bottom surface, a first edge and a second edge, the GMR stack further comprising a plurality of layers; and
    a pair of soft magnetic layers, one of said soft magnetic layers positioned between said first edge of said GMR stack and a first AFM layer, and another of said soft magnetic layers positioned between said second edge of said GMR stack and a second AFM layer, wherein said pair of soft magnetic layers and said first and second AFM layers do not extend onto said top surface of said GMR stack, further wherein said plurality of layers are positioned perpendicular to said soft magnetic layer.

2. The head of claim 1, wherein said AFM layers are selected from a group consisting of Fe3O4, CoO, Fe2O3, and MnO.Fe2O3.

3. The head of claim 1, wherein said AFM layers are selected from a group consisting of NiO and Fe2O3.

4. The head of claim 1, wherein the soft magnetic layer is NiFeX where X is selected from the group consisting of Ta, Cr, Rh, Re and Nb.

5. The head of claim 1, wherein said soft magnetic layers are placed adjacent to said GMR stack and said AFM layers are placed adjacent said soft magnetic layers while in a vacuum in situ.

6. The head of claim 1, wherein said soft magnetic layers each have a thickness of 25 angstroms and each of said AFM layers provide a pinning field of 300 Oe.

7. The head of claim 1, wherein soft magnetic layers provide a pinning field in the range of 100 Oe–500 Oe.

8. A magnetic head comprising:
    a vertical GMR stack, wherein the vertical GMR stack comprises a first edge and a second edge, further wherein said vertical GMR stack is a current-in-plane configuration;
    a first and second AFM layer; and
    a first and second soft magnetic layer, wherein the first soft magnetic layer separates and is connected to said first edge and said first AFM layer, further wherein said second soft magnetic layer separates and is connected to said second edge and said second AFM layer.

9. A magnetic head comprising:
    a vertical GMR stack, wherein the vertical GMR stack comprises at least two free layers and at least one spacer layer, the vertical GMR stack further comprising a first edge and a second edge;
    a first and second AFM layer; and
    a first and second soft magnetic layer, wherein the first soft magnetic layer is positioned between said first edge and said first AFM layer, wherein said second soft magnetic layer is positioned between said second edge and said second AFM layer, further wherein said free layer and said at least one spacer layer are positioned perpendicularly to said soft magnetic layer such that magnetic coupling and direct exchange coupling is established between sad first and second AFM layer and said at least two free layers.

* * * * *

UNITED STATES PATENT AND TRADEMARK OFFICE
CERTIFICATE OF CORRECTION

PATENT NO. : 6,738,235 B1
APPLICATION NO. : 09/813411
DATED : May 18, 2004
INVENTOR(S) : Mao

It is certified that error appears in the above-identified patent and that said Letters Patent is hereby corrected as shown below:

In Column 5, line 15, please make the following change:

"a GMR stack having a ~~ton~~ top surface, a bottom..."

In Column 6, line 26, please make the following change:

"...soft magnetic layer, ~~wherein~~ the first..."

In Column 6, line 35, please make the following change:

"established between ~~sad~~ said first and..."

Signed and Sealed this

First Day of May, 2007

JON W. DUDAS
*Director of the United States Patent and Trademark Office*